United States Patent
Bartell et al.

(10) Patent No.: US 7,364,024 B2
(45) Date of Patent: Apr. 29, 2008

(54) APPARATUS FOR DRIVING AND BRAKING A CUTTING BLADE OF A LAWN MOWER

(75) Inventors: Ricky J. Bartell, Hartford, WI (US); John D. McGourthy, Jr., Mequon, WI (US)

(73) Assignee: Thermoset Inc., Mequon, WI (US)

( * ) Notice: Subject to any disclaimer, the term of this patent is extended or adjusted under 35 U.S.C. 154(b) by 134 days.

(21) Appl. No.: 11/360,644

(22) Filed: Feb. 23, 2006

(65) Prior Publication Data

US 2006/0191519 A1   Aug. 31, 2006

Related U.S. Application Data

(60) Provisional application No. 60/656,341, filed on Feb. 25, 2005.

(51) Int. Cl.
*F16D 11/06* (2006.01)
*F16D 13/22* (2006.01)
*F16D 67/02* (2006.01)

(52) U.S. Cl. .................. 192/18 R; 192/93 R; 477/199

(58) Field of Classification Search ................ 477/199; 192/18 R, 15, 12 R, 12 B, 14, 93 R, 93 A; 56/11.3

See application file for complete search history.

(56) References Cited

U.S. PATENT DOCUMENTS

| 4,205,509 | A | * | 6/1980 | Miyazawa et al. ........... 56/11.3 |
| 4,213,521 | A | | 7/1980 | Modersohn |
| 4,286,701 | A | * | 9/1981 | MacDonald ............... 192/18 R |
| 4,306,405 | A | * | 12/1981 | Fleigle ..................... 56/11.3 |
| 4,313,293 | A | * | 2/1982 | Nagai ........................ 56/11.3 |
| 4,330,054 | A | * | 5/1982 | MacDonald ................. 192/35 |
| 4,372,433 | A | * | 2/1983 | Mitchell et al. .......... 192/18 R |
| 4,388,988 | A | * | 6/1983 | MacDonald ........... 192/12 BA |
| 4,409,779 | A | | 10/1983 | Bent et al. |
| 4,466,233 | A | * | 8/1984 | Thesman ..................... 56/11.3 |
| 4,813,215 | A | | 3/1989 | Chase et al. |
| 5,033,595 | A | * | 7/1991 | Pardee .................... 192/18 R |
| 5,549,186 | A | * | 8/1996 | Pardee .................... 192/18 R |
| 5,570,765 | A | * | 11/1996 | Patridge ...................... 192/15 |
| 6,015,032 | A | | 1/2000 | McGourthy, Jr. et al. |
| 6,460,670 | B2 | * | 10/2002 | Schaedler ................. 192/18 A |
| 6,464,055 | B1 | | 10/2002 | Wians |
| 6,615,964 | B2 | * | 9/2003 | Osborne et al. .......... 192/18 R |
| 6,705,442 | B1 | * | 3/2004 | Patridge ...................... 192/15 |
| 6,827,188 | B2 | * | 12/2004 | Patridge ...................... 192/15 |

* cited by examiner

*Primary Examiner*—Árpád Fábián Kovács
(74) *Attorney, Agent, or Firm*—Quarles & Brady LLP

(57) ABSTRACT

An apparatus for driving and braking a cutting blade of a lawn mower is disclosed. The apparatus includes a shaft for rotating the blade, and a pulley driven by the engine. The shaft extends through a housing. The apparatus includes means for biasing the pulley toward the housing, and means for translating the pulley away from the housing. The apparatus has a stopped position in which the pulley and housing are in friction contact, and has a cutting position in which the pulley and housing are not in friction contact. When power is delivered from the engine to drive the pulley, the apparatus moves from the stopped position to the cutting position such that the pulley and the housing are not in friction contact and the blade rotates. When power ceases being delivered to the pulley, the apparatus moves from the cutting position to the stopped position such that the pulley and the housing are placed in friction contact and the blade stops.

20 Claims, 8 Drawing Sheets

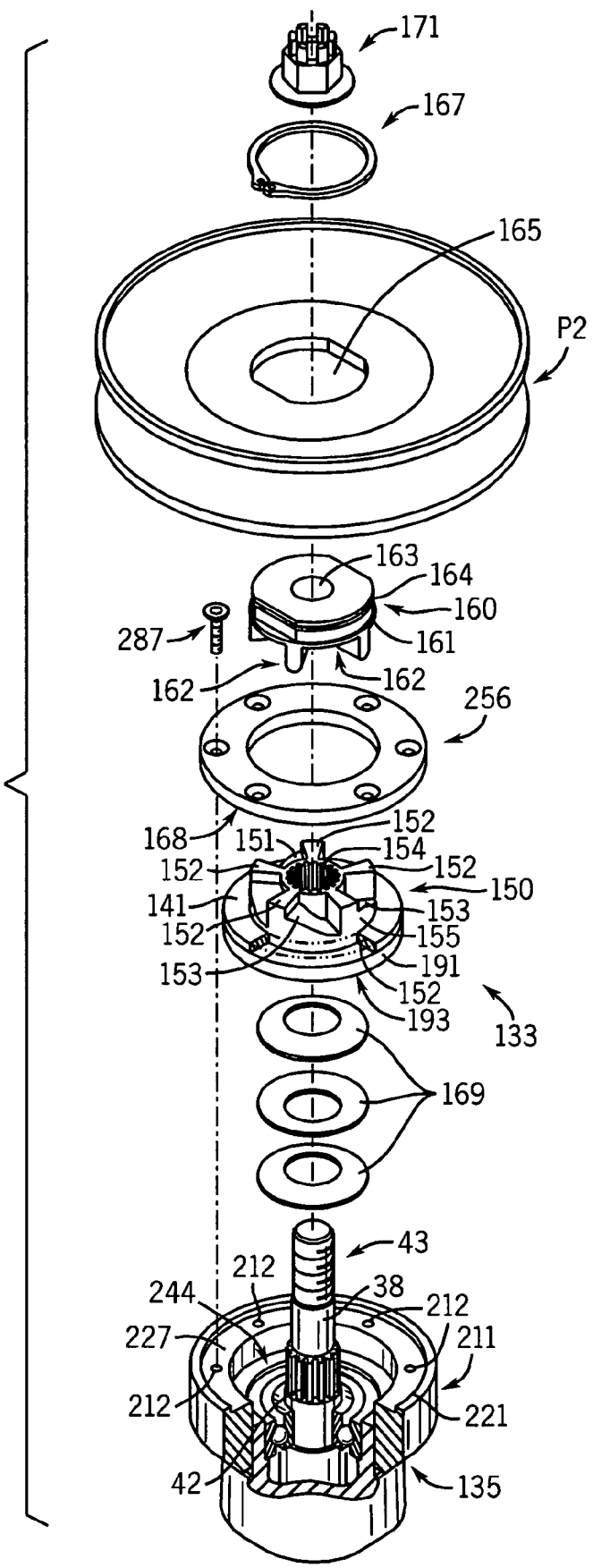

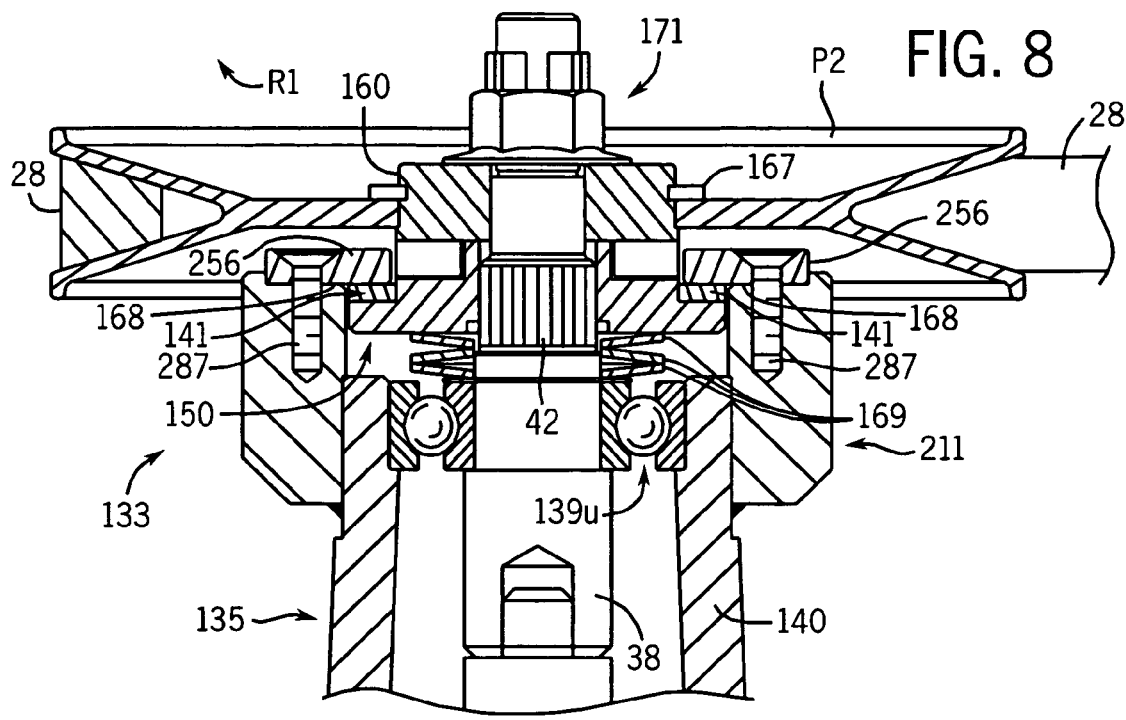
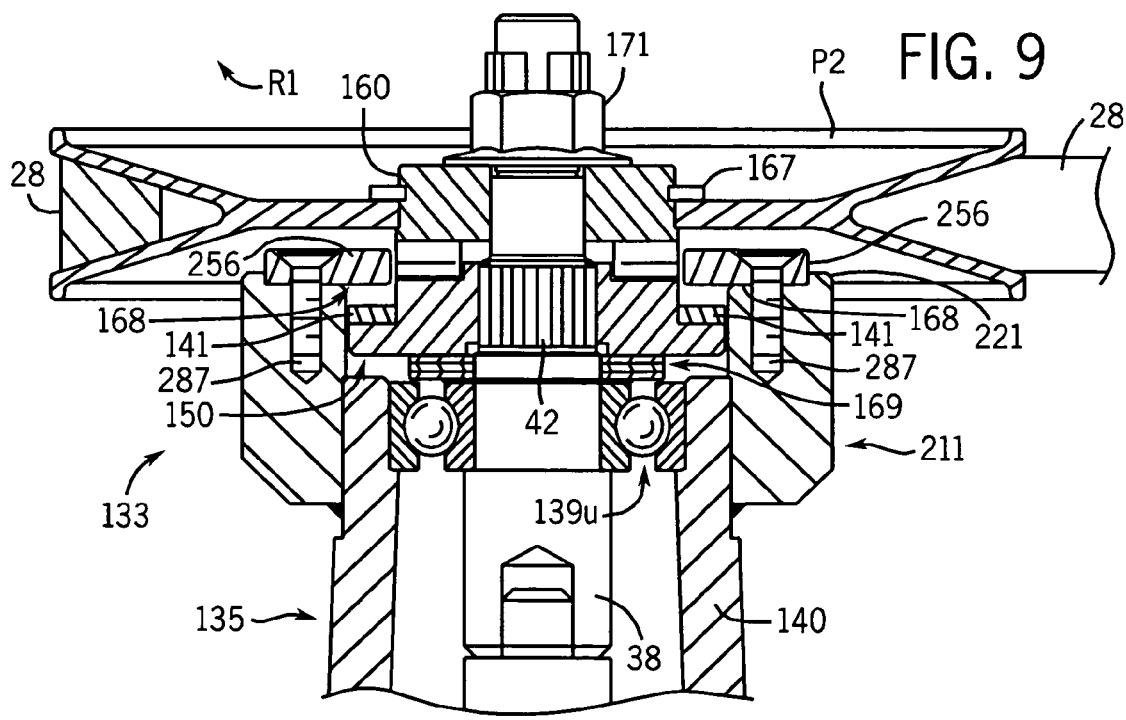

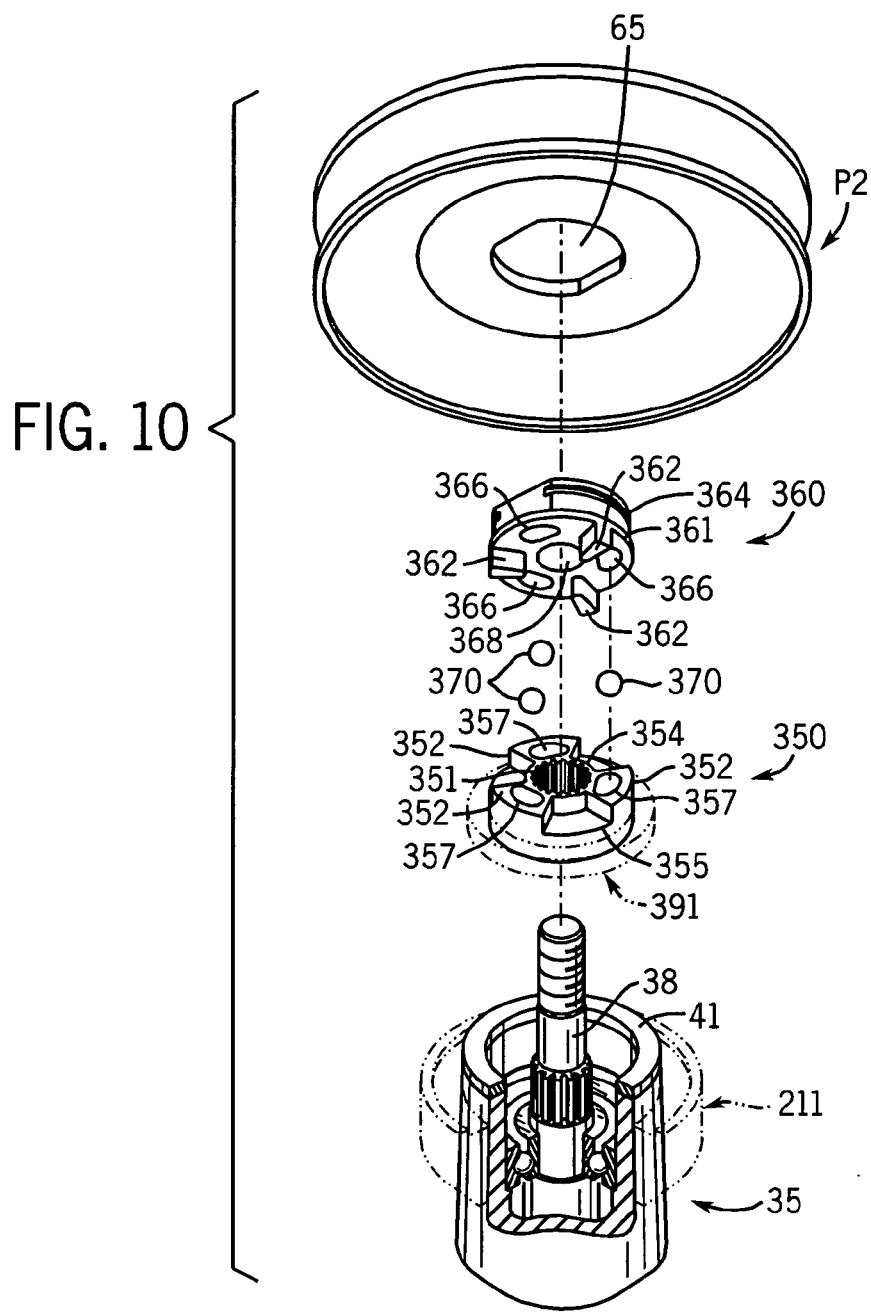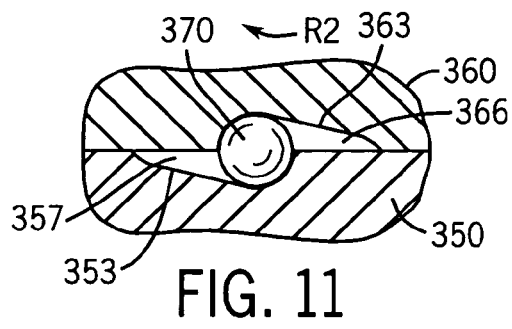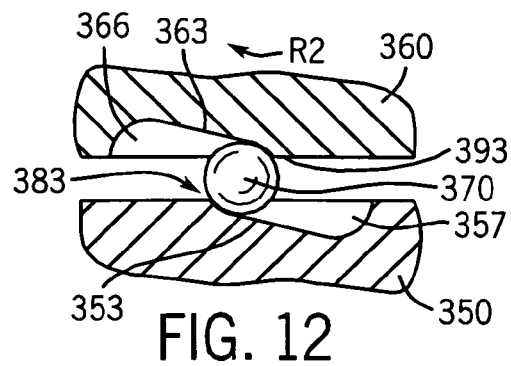

APPARATUS FOR DRIVING AND BRAKING A CUTTING BLADE OF A LAWN MOWER

CROSS-REFERENCES TO RELATED APPLICATIONS

The application claims benefit from U.S. Provisional Patent Application No. 60/656,341 filed Feb. 25, 2005.

STATEMENT REGARDING FEDERALLY SPONSORED RESEARCH

Not Applicable.

BACKGROUND OF THE INVENTION

1. Field of the Invention

The invention relates generally to rotary lawn mowers and, more particularly, to an apparatus for driving and braking a cutting blade of a lawn mower.

2. Description of the Related Art

The power lawn mower industry has constantly and diligently searched for devices that eliminate the hazards presented by a rapidly rotating mower blade in view of the fact that mower blade accidents can result from failure of a user to appreciate that the momentum of a mower blade tends to keep it in rotation for a period of time after it is declutched from the engine that drives it. A number of mower blade brakes have been developed to arrest rotation of the mower blade promptly upon its being declutched from the engine. See, for example, U.S. Pat. Nos. 4,813,215, 4,409,779 and 4,213,521. Many of these devices can be complicated to assemble and therefore, there is a continuing need for an improved blade brake for a lawn mower.

BRIEF SUMMARY OF THE INVENTION

The foregoing needs are met by the present invention which provides an apparatus for driving and braking a cutting blade of a lawn mower.

In one aspect, the invention provides an apparatus for driving and braking a rotary cutting blade of a lawn mower powered by an engine. The apparatus includes a shaft secured to the cutting blade for rotating the cutting blade, and a pulley driven by the engine. The shaft extends through a passageway in a housing. The shaft is rotatably secured in a center of the pulley, and the pulley is positioned above the housing. The apparatus also includes means for biasing the pulley downward toward the housing, and means for translating the pulley away from the housing. The means for biasing may include at least one spring washer mounted over the shaft between the pulley and a mounting piece on an end of the shaft.

The apparatus has a stopped position in which the pulley and the housing are in contact at a friction surface between the pulley and the housing, and has a cutting position in which the pulley and the housing are not in contact at the friction surface. The friction surface may be a side of a friction material, and preferably, the friction surface is a ring of friction material mounted on the pulley or a top edge of the housing.

When power is delivered from the engine to drive the pulley, the means for translating transitions the apparatus from the stopped position to the cutting position such that the pulley and the housing are not in contact at the friction surface and the cutting blade rotates. When power ceases being delivered from the engine to drive the pulley, the apparatus moves from the cutting position to the stopped position by way of the means for translating the pulley such that the pulley and the housing are placed in contact at the friction surface and the cutting blade stops.

In one form, the means for translating includes a first annular transverse member mounted to the pulley, and a second annular transverse member mounted to the shaft. At least one of the first transverse member and the second transverse member has a cam surface inclined upward in a direction of shaft rotation from a first stop to a second stop. When power is delivered from the engine to drive the pulley, the apparatus moves from the stopped position to the cutting position by way of travel of the first transverse member or the second transverse member on the inclined cam surface from the first stop to the second stop such that the pulley and the housing are not in contact at the friction surface and the cutting blade rotates. When power ceases being delivered from the engine to drive the pulley, the apparatus moves from the cutting position to the stopped position by way of travel of the first transverse member or the second transverse member on the inclined cam surface from the second stop to the first stop such that the pulley and the housing are placed in contact at the friction surface and the cutting blade stops. The first transverse member or the second transverse member may include an outwardly projecting rib for travel on the inclined cam surface. Preferably, the first transverse member includes a plurality of the outwardly projecting ribs equally spaced around the first transverse member, and the second transverse member includes a plurality of the inclined cam surfaces equally spaced around the second transverse member.

In another form, the means for translating includes a first annular transverse member mounted to the pulley and a second annular transverse member mounted to the shaft. The first transverse member has a first bearing surface inclined upward in a direction of shaft rotation, and has a first stop and a second stop. The second transverse member has a second bearing surface inclined upward in a direction of shaft rotation, and has a third stop and a fourth stop. The means for translating further includes a bearing positioned in contact with the first bearing surface and the second bearing surface. When power is delivered from the engine to drive the pulley, the apparatus moves from the stopped position to the cutting position by way of travel of the first bearing surface on the bearing from the first stop to the second stop and travel of the second bearing surface on the bearing from the third stop to the fourth stop such that the pulley and the housing are not in contact at the friction surface and the cutting blade rotates. When power ceases being delivered from the engine to drive the pulley, the apparatus moves from the cutting position to the stopped position by way of travel of the first bearing surface on the bearing from the second stop to the first stop and travel of the second bearing surface on the bearing from the fourth stop to the third stop such that the pulley and the housing are placed in contact at the friction surface and the cutting blade stops.

In another aspect, the invention provides an apparatus for driving and braking a rotary cutting blade of a lawn mower powered by an engine. The apparatus includes a shaft secured to the cutting blade for rotating the cutting blade, and a pulley driven by the engine. The shaft extends through a passageway in a housing, and the shaft is rotatably secured in a center of the pulley which is positioned above the housing. The apparatus further includes means for biasing the pulley away from the housing, and means for translating the pulley toward the housing. The means for biasing may include at least one spring washer mounted over the shaft between a transverse mounting piece on the shaft and the means for translating.

The apparatus has a stopped position in which the housing and the means for translating are in contact at a friction surface between the housing and the means for translating, The apparatus has a cutting position in which the housing and the means for translating are not in contact at the friction surface, The friction surface may be a side of a friction material, and preferably, the friction surface is a ring of friction material mounted on the pulley or a top edge of the housing.

When power is delivered from the engine to drive the pulley, the means for translating transitions the apparatus from the stopped position to the cutting position such that the housing and the means for translating are not in contact at the friction surface and the cutting blade rotates. When power ceases being delivered from the engine to drive the pulley, the apparatus moves from the cutting position to the stopped position such that the housing and the means for translating are placed in contact at the friction surface and the cutting blade stops.

In one form, the means for translating includes a first annular transverse member mounted to the pulley, and a second annular transverse member mounted to the shaft. At least one of the first transverse member and the second transverse member has a cam surface inclined upward in a direction of shaft rotation from a first stop to a second stop. When power is delivered from the engine to drive the pulley, the apparatus moves from the stopped position to the cutting position by way of travel of the first transverse member or the second transverse member on the inclined cam surface from the first stop to the second stop such that the housing and the second transverse member are not in contact at the friction surface and the cutting blade rotates. When power ceases being delivered from the engine to drive the pulley, the apparatus moves from the cutting position to the stopped position by way of travel of the first transverse member or the second transverse member on the inclined cam surface from the second stop to the first stop such that the housing and the second transverse member are placed in contact at the friction surface and the cutting blade stops.

The first transverse member or the second transverse member may include an outwardly projecting rib for travel on the inclined cam surface. Preferably, the first transverse member includes a plurality of the outwardly projecting rib equally spaced around the first transverse member, and the second transverse member includes a plurality of the inclined cam surface equally spaced around the second transverse member.

In another form, the means for translating includes a first transverse member mounted to the pulley, and a second transverse member mounted to the shaft. The first transverse member has a first bearing surface inclined upward in a direction of shaft rotation, and has a first stop and a second stop. The second transverse member has a second bearing surface inclined upward in a direction of shaft rotation, and the second transverse member has a third stop and a fourth stop. The means for translating further includes a bearing positioned in contact with the first bearing surface and the second bearing surface. When power is delivered from the engine to drive the pulley, the apparatus moves from the stopped position to the cutting position by way of travel of the first bearing surface on the bearing from the first stop to the second stop and travel of the second bearing surface on the bearing from the third stop to the fourth stop such that the housing and the means for translating are not in contact at the friction surface and the cutting blade rotates. When power ceases being delivered from the engine to drive the pulley, the apparatus moves from the cutting position to the stopped position by way of travel of the first bearing surface on the bearing from the second stop to the first stop and travel of the second bearing surface on the bearing from the fourth stop to the third stop such that the housing and the means for translating are placed in contact at the friction surface and the cutting blade stops.

These and other features, aspects, and advantages of the present invention will become better understood upon consideration of the following detailed description, drawings, and appended claims.

BRIEF DESCRIPTION OF THE DRAWINGS

FIG. 7 is an exploded perspective view of a second embodiment of an apparatus according to the invention for driving and braking a rotary cutting blade.

FIG. 8 is a cross sectional view of the apparatus of FIG. 7 in a stopped position.

FIG. 9 is a cross sectional view of the apparatus of FIG. 7 in a cutting position.

FIG. 10 is an exploded perspective view of a third embodiment of an apparatus according to the invention for driving and braking a rotary cutting blade.

FIG. 11 is a partial cross sectional view of the annular braking and driving members of the apparatus of FIG. 10 in a stopped position.

FIG. 12 is a partial cross sectional view of the annular braking and driving members of the apparatus of FIG. 10 in a cutting position.

Figure 1:
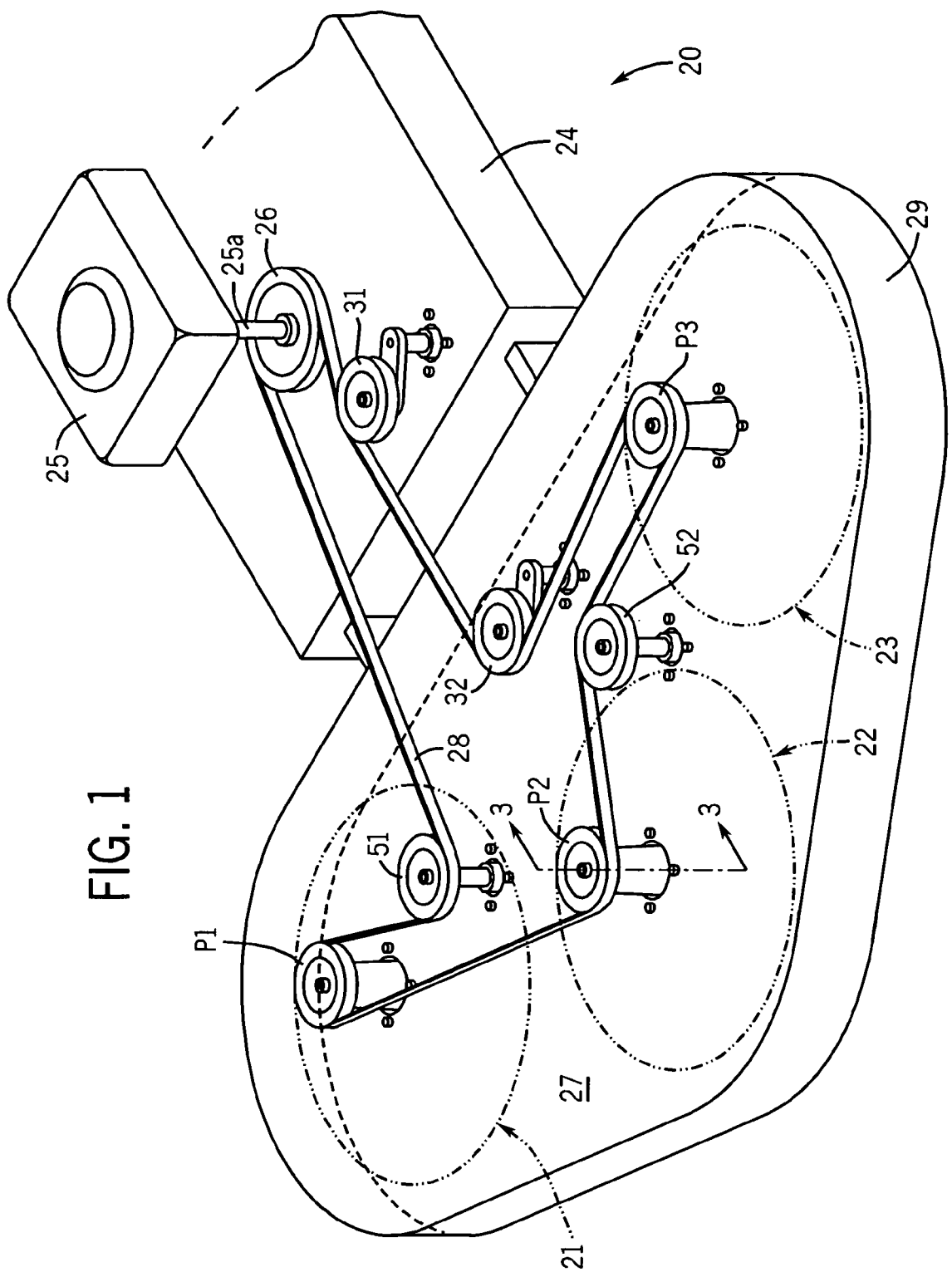
FIG. 1 is a partial perspective view of a lawn mower suitable for use with an apparatus according to the invention for driving and braking a cutting blade.
Figure 2:
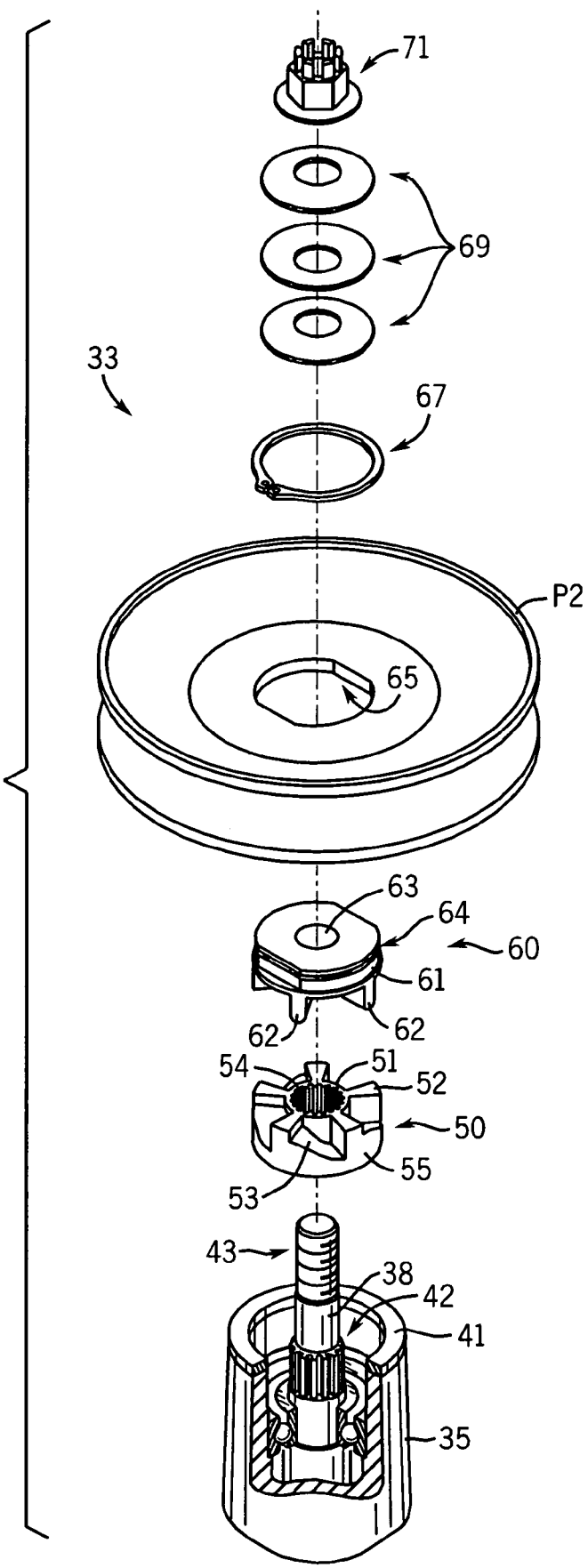
FIG. 2 is an exploded perspective view of a first embodiment of an apparatus according to the invention for driving and braking a rotary cutting blade.

It should be understood that the embodiments are sometimes illustrated by phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DETAILED DESCRIPTION

Turning to FIG. 1, there is shown a partial view of a lawn mower 20 in order to provide context for the present invention. Although this invention is well suited for a mower having only one blade, it is shown here with a mower 20 having a three rotary blades 21, 22, 23 shown in phantom in FIG. 1. The mower 20 has a riding chassis 24 as is well known in the art. An engine 25 drives the chassis 24 as well as the mower blades 21, 22, 23. A driving pulley 26 is secured to the output shaft 25a of the engine 25. A driven pulley P1, P2, P3 for each of the respective mower blades 21, 22, 23 is mounted above the top wall 27 of a skirted mower deck 29, and each blade 21, 22, 23 is mounted beneath the mower deck 29 and rotates with its driven pulley as described below.

A belt 28 is trained around the driving pulley 26 and the driven pulleys P1, P2, P3. The belt 28 is of the V-belt type, having a laterally tapering inner side and an opposite outer side (see FIG. 3). The inner side of the belt 28 engages with the driving pulley 26 and driven pulleys P1, P2, P3, which have V-grooves that provide a good frictional connection with belt 28. Stationary pulleys S1, S2 are mounted at a fixed location on top of the mower deck 29. Belt tensioning pulleys 31, 32 are engaged with the belt 28 by conventional means (not shown) to tighten the belt 28 and allow for transmission of motion from driving pulley 26 to driven pulleys P1, P2, P3. Likewise, belt tensioning pulleys 31, 32 are disengaged from the belt 28 to permit belt slackening and thereby cease transmission of motion from driving pulley 26 to driven pulleys P1, P2, P3. This type of belt tensioning transmission is known to those skilled in the art.

Referring now to FIGS. 2-6, there is shown a first embodiment of an apparatus 33 according to the invention for driving and braking a rotary cutting blade (such as blade 22 of FIG. 1). The apparatus 33 includes a housing 35 having a hollow cylindrical section 40. The housing 35 may be mounted to the deck 29 by way of screws 36. A shaft 38 is located within the hollow cylindrical section 40 and the shaft 38 is journaled for rotation using upper bearing 39u and lower bearing 39L. The cutting blade 22 is mounted on the shaft 38 by way of screw 37.

Figure 3:
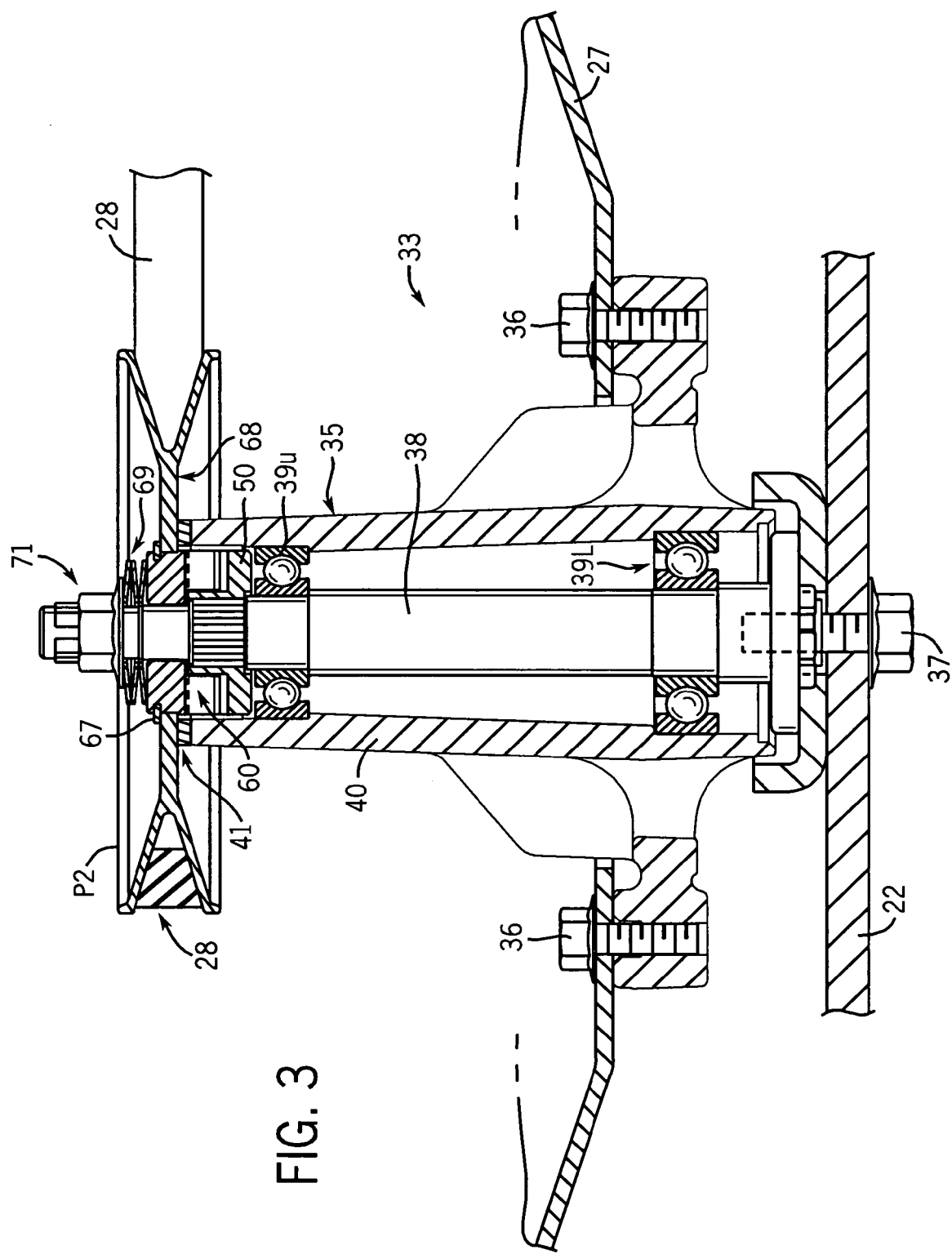
FIG. 3 is a cross sectional view taken along line 3-3 of FIG. 1 of the apparatus of FIG. 2 in a stopped position.

The apparatus 33 also includes a first upper transverse annular member 60 having a side wall 61 and five downwardly projecting ribs 62 equally radially spaced around a central hole 63. The upper annular member 60 is fixedly mounted in a hole 65 in pulley P2 by way of retaining ring 67 that is received in a groove 64 in the side wall 61 of the upper annular member 60. The retaining ring 67 rests on the upper surface of the pulley P2 as shown in FIG. 3. The shaft 38 extends through the hole 63 of the upper annular member 60 and spring washers 69 are arranged around the shaft 38. A nut 71 engages threads 43 on the upper end of the shaft 38 as shown in FIG. 3. The spring washers 69 provide a means for biasing the pulley P2 toward the housing 35. Alternative biasing means include a spring wire form or a coil compression spring.

The apparatus 33 also includes a second lower transverse annular member 50 having a side wall 55 and five upwardly extending walls 52 equally radially spaced around a central hole 54 which has a longitudinally grooved inner surface 51. Between adjacent upwardly extending walls 52, there is provided inclined surfaces 53 that slope upwardly in the direction of rotation R of the shaft 38 (see FIG. 5). The lower annular member 50 is mounted on the shaft 38 by way of engagement of the longitudinally grooved inner surface 51 of the central hole 54 and spline 42 extending around the shaft 38.

Figure 5:
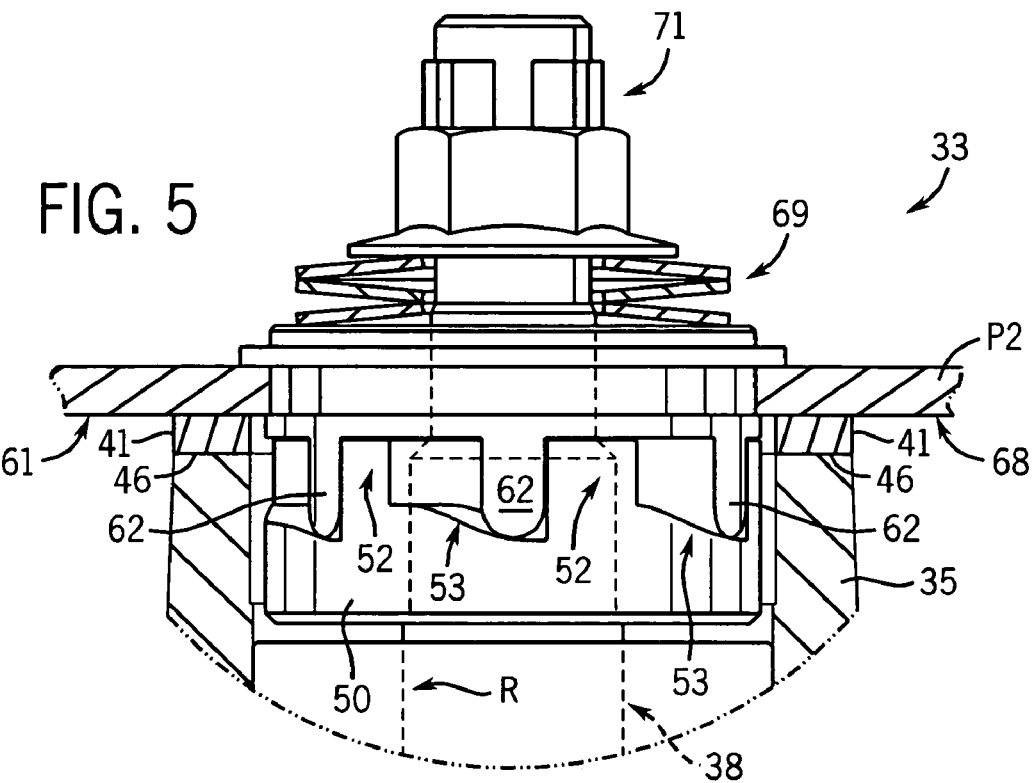
FIG. 5 is a partial cross sectional view of the apparatus of FIG. 3.

Referring now to FIGS. 3 and 5, the apparatus 33 is shown in a stopped position, that is, the inner side of the belt 28 is not engaged with the driving pulley 26 and the driven pulley P2 as described above. The spring washers 69 bias the pulley P2 downward toward the housing 35. A friction ring 41 located on an upper circular surface 46 of the hollow cylindrical section 40 of the housing 35 contacts undersurface 68 of the pulley P2. By engaging the undersurface 68 of the pulley P2 and the upper circular surface 46 of the hollow cylindrical section 40 of the housing 35, the friction ring 41 provides a brake for pulley P2. Suitable friction rings are available from Thermoset Friction Material Specialists, Mequon, Wis., USA.

Figure 4:
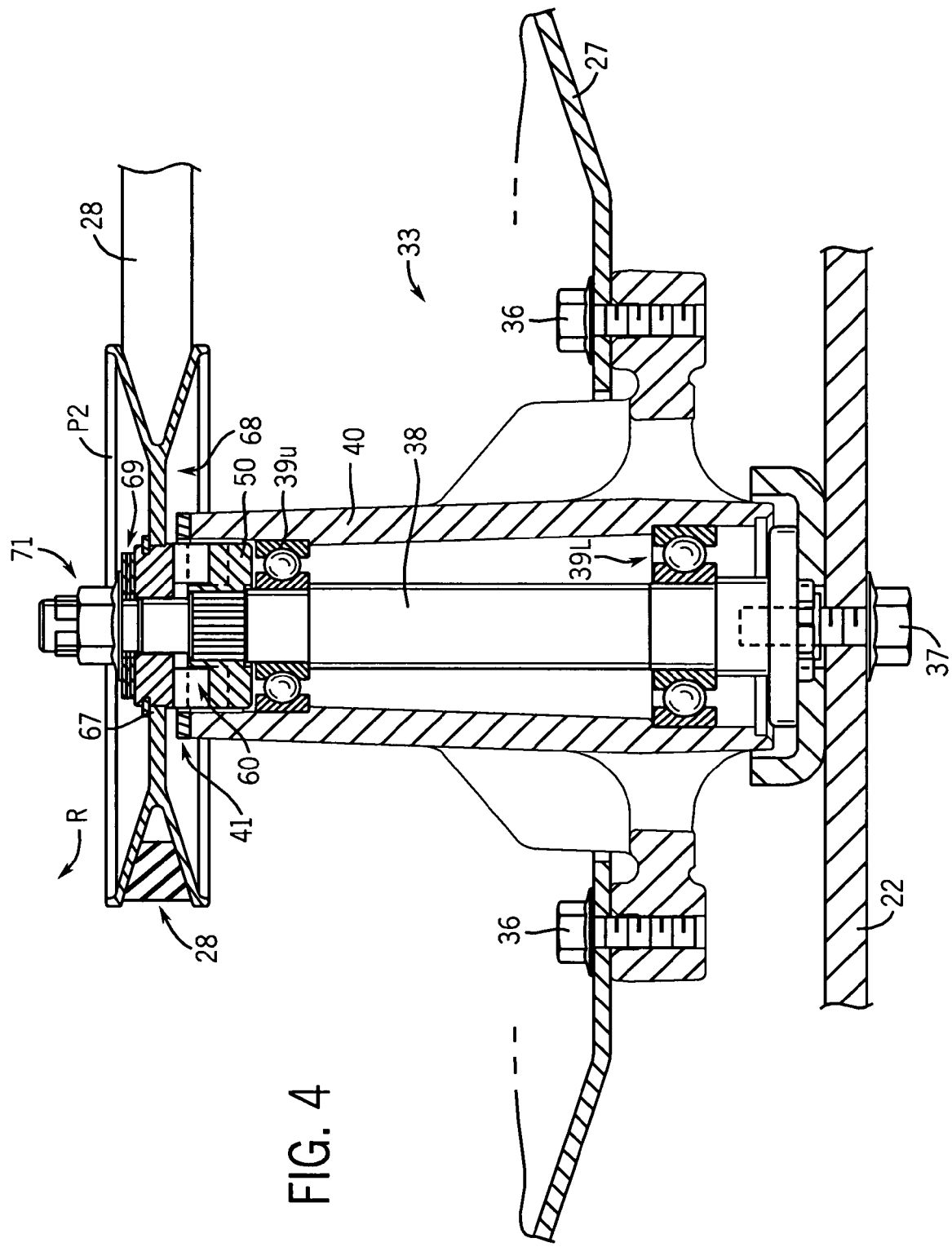
FIG. 4 is a cross sectional view taken along line 3-3 of FIG. 1 of the apparatus of FIG. 2 in a cutting position.
Figure 6:
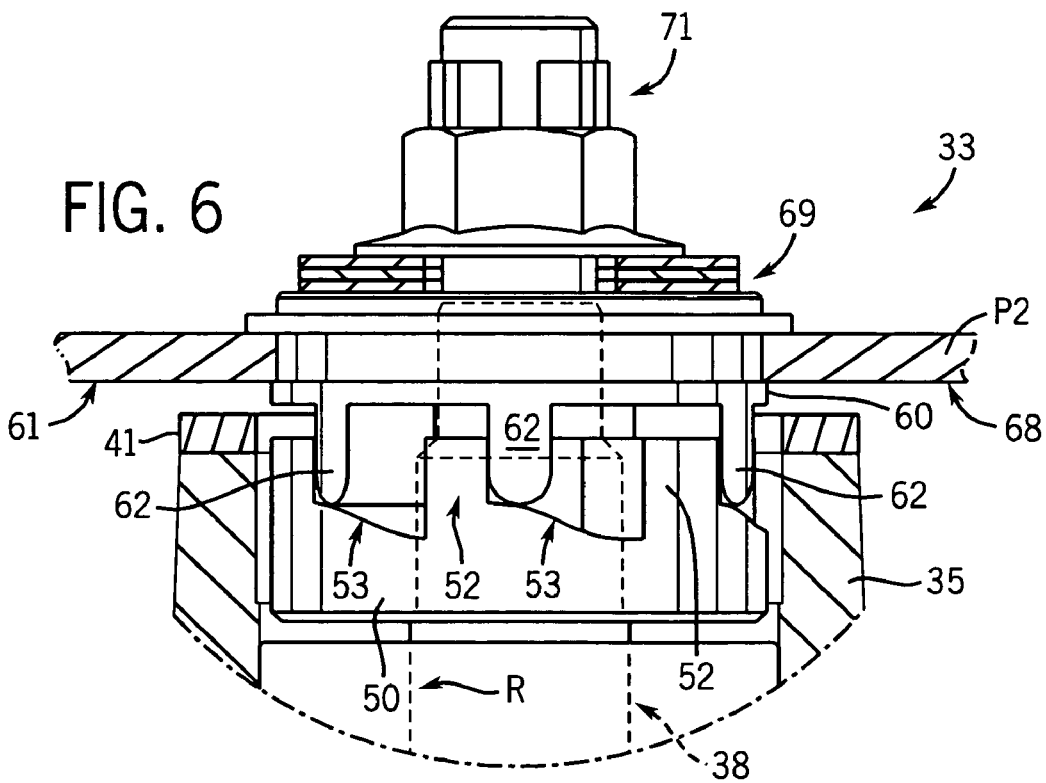
FIG. 6 is a partial cross sectional view of the apparatus of FIG. 4.

Referring now to FIGS. 4 and 6, the apparatus 33 is shown in a cutting position for the mower. When the inner side of the belt 28 engages with the driving pulley 26 and driven pulley P2 as described above, rotation of the pulley P2 in direction R causes ribs 62 of the upper annular member 60 to ride up the inclined surfaces 53 that slope upwardly in the direction of rotation R of the lower annular member 50. As a result, the biasing force of the spring washers 69 is overcome and friction ring 41 disengages from the undersurface 68 of the pulley P2 as shown in FIG. 6. When ribs 62 of the upper annular member 60 reach contact with the upward walls 52 of the lower annular member 50, the lower annular member 50 and attached shaft 38 begin rotating in direction R thereby rotating cutting blade 22. As long as the inner side of the belt 28 remains engaged with the driving pulley 26 and driven pulley P2, ribs 62 of the upper annular member 60 remain in contact with the upward walls 52 of the lower annular member 50 thereby rotating the lower annular member 50 and attached shaft 38 and cutting blade 22. Thus, the lower annular member 50 and the upper annular member 60 provide a means for translating the pulley P2 away from the housing 35.

When the inner side of the belt 28 is disengaged from driven pulley P2, the biasing force of spring washers 69 pushes down on the pulley P2 causing ribs 62 of the upper annular member 60 to ride down the inclined surfaces 53 of the lower annular member 50. As a result, the friction ring 41 engages the undersurface 68 of the pulley P2 as shown in FIG. 5. Rotation of the pulley P2 then stops and then rotation of the shaft 38 and blade 22 stops due to the stopped ribs 62 of the upper annular member 60 stopping movement of the lower annular member 50 by way of walls 52. Because shaft 38 is attached to the lower annular member 50, rotation of the shaft 38 and attached blade 22 stops. Thus, the blade has been braked.

Referring now to FIGS. 7-9, there is shown a second embodiment of an apparatus 133 according to the invention for driving and braking a rotary cutting blade (such as blade 22 of FIG. 1). The apparatus 133 includes a housing 135 having a hollow cylindrical section 140. The housing 135 may be mounted to the deck 29 by way of screws as in FIG. 3. A shaft 38 is located within the hollow cylindrical section 140 and the shaft 38 is journaled for rotation using upper bearing 139u and a lower bearing (not shown). The cutting blade 23 is mounted on the shaft 38 by way of screw 37 as in FIG. 3.

The apparatus 133 also includes a first upper transverse annular member 160 having a side wall 161 and five downwardly projecting ribs 162 equally radially spaced around a central hole 163. The upper annular member 160 is fixedly mounted in a hole 165 in pulley P2 by way of retaining ring 167 that is received in a groove 164 in the side wall 161 of the upper annular member 160. The retaining ring 167 rests on the upper surface of the pulley P2 as shown in FIG. 8. The shaft 38 extends through the hole 163 of the upper annular member 160 and a nut 171 engages threads 43 on the upper end of the shaft 38 as shown in FIG. 8.

The apparatus 133 also includes a second lower transverse annular member 150 having a side wall 155 and five upwardly extending walls 152 equally radially spaced around a central hole 154 which has a longitudinally grooved inner surface 151. Between adjacent upwardly extending walls 152, there is provided an inclined surface 153 that slope upwardly in the direction of rotation R1 of the shaft 38 (see FIG. 8). The lower annular member 150 also includes a flange 191 extending outwardly from the side wall 155. A friction ring 141 is located on the upper surface of the flange 191. The lower annular member 150 also includes a lower surface 193.

The housing 135 includes an upper annular rim 211 with screw holes 212 in its upper surface 227. A lip 221 extends around the rim 211. The upper rim 211 surrounds an annular recess 244 of the housing 135. When assembling the apparatus 133, spring washers 169 are placed over the shaft 38 and the spring washers 169 rest on upper bearing 139u (see FIG. 8) or an inner shoulder in the housing 135. The spring washers 169 provide a means for biasing the pulley P2 away from the housing 135. Alternative biasing means include a spring wire form or a coil compression spring. The lower annular member 150 is mounted on the shaft 38 above the spring washers 169 by way of engagement of the longitudinally grooved inner surface 151 of the central hole 154 and spline 42 extending around the shaft 38. An annular mounting ring 256 is attached to the upper surface 227 of the annular rim 211 using screws 287.

Referring now to FIG. 8, the apparatus 133 is shown in a stopped position, that is, the inner side of the belt 28 is not engaged with the driving pulley 26 and the driven pulley P2 as described above. The spring washers 169 bias the lower annular member 150 upwardly toward the mounting ring 256. The friction ring 141 located on the flange 191 of the lower annular member 150 contacts undersurface 168 of the mounting ring 256. By engaging the undersurface 168 of the mounting ring 256, the friction ring 141 brakes the lower annular member 150.

Referring now to FIG. 9, the apparatus 133 is shown in a cutting position for the mower. When the inner side of the belt 28 engages with the driving pulley 26 and driven pulley P2 as described above, rotation of the pulley P2 in direction R1 causes ribs 162 of the upper annular member 160 to ride up the inclined surfaces 153 that slope upwardly in the direction of rotation R of the lower annular member 150 as in the embodiment of FIGS. 4 and 6. As a result, the biasing force of the spring washers 169 is overcome and friction ring 141 disengages from the undersurface 168 of the mounting ring 256 as shown in FIG. 9. When ribs 162 of the upper annular member 160 reach contact with the upward walls 152 of the lower annular member 150, the lower annular member 150 and attached shaft 38 begin rotating in direction R1 thereby rotating cutting blade 22. As long as the inner side of the belt 28 remains engaged with the driving pulley 26 and driven pulley P2, ribs 162 of the upper annular member 160 remain in contact with the upward walls 152 of the lower annular member 150 thereby rotating the lower annular member 150 and attached shaft 38 and cutting blade 22. Thus, the lower annular member 150 and the upper annular member 160 provide a means for translating the pulley P2 toward the housing 35.

When the inner side of the belt 28 is disengaged from driven pulley P2, the biasing force of spring washers 169 pushes up on the lower annular member 150 causing ribs 162 of the upper annular member 160 to ride down the inclined surfaces 153 of the lower annular member 150. As a result, the friction ring 141 engages the undersurface 168 of the mounting ring 256 as shown in FIG. 8. Rotation of the pulley P2 then stops and then rotation of the shaft 38 and blade 22 stops due to the stopped ribs 162 of the upper annular member 160 stopping movement of the lower annular member 150 by way of walls 152. Because shaft 38 is attached to the lower annular member 150, rotation of the shaft 38 and attached blade 22 stops. Thus, the blade has been braked.

Turning now to FIGS. 10-12, there is shown an alternative first upper annular member 360 and an alternative second lower annular member 350 for use in the apparatus 33 or 133. The upper annular member 360 has a side wall 361, three grooves 366 equally radially spaced around a central hole 368, and three downwardly projecting ribs 362 equally radially spaced around the central hole 368 between the grooves 366. The grooves 366 have inclined surfaces 363 that slope upwardly in the direction of rotation R2 of the shaft 38 (see FIGS. 11 and 12). The upper annular member 360 can be fixedly mounted in hole 65 in pulley P2 by way of retaining ring 67 that is received in a groove 364 in the side wall 361 of the upper annular member 360 in the manner shown in FIG. 3. The retaining ring 67 rests on the upper surface of the pulley P2 as shown in FIG. 3. The shaft 38 extends through the hole 368 of the upper annular member 360 and nut 71 engages threads 43 on the upper end of the shaft 38 as shown in FIG. 3.

The lower annular member 350 has a side wall 355 and three upwardly extending walls 352 equally radially spaced around a central hole 354 which has a longitudinally grooved inner surface 351. In the top surface of each of the upwardly extending walls 352, there is provided a groove 357 having an inclined surface 353 that slopes upwardly in the direction of rotation R2 of the shaft 38 (see FIGS. 11 and 12). The lower annular member 350 may mounted on the shaft 38 by way of engagement of the longitudinally grooved inner surface 351 of the central hole 354 and spline 42 extending around the shaft 38 in the manner shown in FIG. 3.

Referring now to FIG. 11, the upper annular member 360 and the lower annular member 350 are shown in a stopped position, that is, the inner side of the belt 28 is not engaged with the driving pulley 26 and the driven pulley P2 as described above. Ball bearings 370 are sandwiched between the inclined surface 353 of the groove 357 of the lower annular member 350 and the inclined surface 363 of the groove 366 of the upper annular member 360. Spring washers 69 bias the pulley P2 downward toward the housing 35 in the manner shown in FIG. 3. The friction ring 41 located on the upper circular surface 46 of the hollow cylindrical section 40 of the housing 35 contacts undersurface 68 of the pulley P2. By engaging the undersurface 68 of the pulley P2 and the upper circular surface 46 of the hollow cylindrical section 40 of the housing 35, the friction ring 41 provides a brake for pulley P2.

Referring now to FIG. 12, the upper annular member 360 and the lower annular member 350 are shown in a cutting position for the mower. When the inner side of the belt 28 engages with the driving pulley 26 and driven pulley P2 as described above, rotation of the pulley P2 in direction R2 causes the inclined surface 363 of the groove 366 of the upper annular member 360 to ride up the ball bearing 370. As a result, the biasing force of the spring washers 69 is overcome and friction ring 41 disengages from the undersurface 68 of the pulley P2 as shown in the manner of FIG. 6. When ball bearing 370 reaches contact with the end 393 of the groove 366 the upper annular member 360 and the end 383 of the groove 357 of the lower annular member 350, the lower annular member 350 and attached shaft 38 begin rotating in direction R2 thereby rotating cutting blade 22. As long as the inner side of the belt 28 remains engaged with the driving pulley 26 and driven pulley P2, ball bearing 370 remains in contact with the end 393 of the groove 366 of the upper annular member 360 and the end 383 of the groove 357 of the lower annular member 350 thereby rotating the lower annular member 350 and attached shaft 38 and cutting blade 22. Thus, the lower annular member 350, the upper annular member 360 and the ball bearing 370 provide a means for translating the pulley P2 away from the housing 35.

When the inner side of the belt 28 is disengaged from driven pulley P2, the biasing force of spring washers 69 pushes down on the pulley P2 causing the inclined surface 363 of the groove 366 of the upper annular member 360 to ride down the ball bearing 370. As a result, the friction ring 41 engages the undersurface 68 of the pulley P2 as shown in FIG. 5. Rotation of the pulley P2 then stops and then rotation of the shaft 38 and blade 22 stops. Because shaft 38 is attached to the lower annular member 350, rotation of the shaft 38 and attached blade 22 stops. Thus, the blade has been braked.

The ball bearings 370, the lower annular member 350 and the upper annular member 360 can also be integrated into the embodiment of FIGS. 7-9. In this version of the invention, the lower annular member 350 includes flange 391 (drawn in phantom in FIG. 10) and housing 35 includes annular rim 211 (drawn in phantom in FIG. 10).

Thus, the present invention provides an apparatus for driving and braking a cutting blade of a lawn mower. The apparatus is less complicated to assemble and reduces clutter on the deck of a lawn mower.

Although the present invention has been described with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An apparatus for driving and braking a rotary cutting blade of a lawn mower powered by an engine, the apparatus comprising:
   a shaft secured to the cutting blade for rotating the cutting blade, the shaft extending through a passageway in a housing;
   a pulley driven by the engine, the shaft being rotatably secured in a center of the pulley, the pulley being positioned above the housing;
   means for biasing the pulley downward toward the housing,
   means for translating the pulley away from the housing;
   wherein the apparatus has a stopped position in which the pulley and the housing are in contact at a friction surface between the pulley and the housing,
   wherein the apparatus has a cutting position in which the pulley and the housing are not in contact at the friction surface,
   wherein, when power is delivered from the engine to drive the pulley, the means for translating transitions the apparatus from the stopped position to the cutting position such that the pulley and the housing are not in contact at the friction surface and the cutting blade rotates, and
   wherein, when power ceases being delivered from the engine to drive the pulley, the apparatus moves from the cutting position to the stopped position such that the pulley and the housing are placed in contact at the friction surface and the cutting blade stops.

2. The apparatus of claim 1 wherein:
   the means for translating comprises:
      a first transverse member mounted to the pulley; and
      a second transverse member mounted to the shaft, at least one of the first transverse member and the second transverse member having a cam surface inclined upward in a direction of shaft rotation from a first stop to a second stop;
   wherein, when power is delivered from the engine to drive the pulley, the apparatus moves from the stopped position to the cutting position by way of travel of the first transverse member or the second transverse member on the inclined cam surface from the first stop to the second stop such that the pulley and the housing are not in contact at the friction surface and the cutting blade rotates, and
   wherein, when power ceases being delivered from the engine to drive the pulley, the apparatus moves from the cutting position to the stopped position by way of travel of the first transverse member or the second transverse member on the inclined cam surface from the second stop to the first stop such that the pulley and the housing are placed in contact at the friction surface and the cutting blade stops.

3. The apparatus of claim 2 wherein:
   the first transverse member and the second transverse member are annular.

4. The apparatus of claim 2 wherein:
   the first transverse member or the second transverse member includes an outwardly projecting rib for travel on the inclined cam surface.

5. The apparatus of claim 4 wherein:
   the first transverse member includes a plurality of the outwardly projecting rib equally spaced around the first transverse member, and
   the second transverse member includes a plurality of the inclined cam surface equally spaced around the second transverse member.

6. The apparatus of claim 1 wherein:
   the means for translating comprises:
      a first transverse member mounted to the pulley, the first transverse member having a first bearing surface inclined upward in a direction of shaft rotation, the first transverse member having a first stop and a second stop;
      a second transverse member mounted to the shaft, the second transverse member having a second bearing surface inclined upward in a direction of shaft rotation, the second transverse member having a third stop and a fourth stop; and
      a bearing positioned in contact with the first bearing surface and the second bearing surface,
   wherein, when power is delivered from the engine to drive the pulley, the apparatus moves from the stopped position to the cutting position by way of travel of the first bearing surface on the bearing from the first stop to the second stop and travel of the second bearing surface on the bearing from the third stop to the fourth stop such that the pulley and the housing are not in contact at the friction surface and the cutting blade rotates, and
   wherein, when power ceases being delivered from the engine to drive the pulley, the apparatus moves from the cutting position to the stopped position by way of travel of the first bearing surface on the bearing from the second stop to the first stop and travel of the second bearing surface on the bearing from the fourth stop to the third stop such that the pulley and the housing are placed in contact at the friction surface and the cutting blade stops.

7. The apparatus of claim 6 wherein:
the first transverse member and the second transverse member are annular.

8. The apparatus of claim 1 wherein:
the friction surface is a side of a friction material.

9. The apparatus of claim 1 wherein:
the friction surface is a ring of friction material mounted on the pulley or a top edge of the housing.

10. The apparatus of claim 1 wherein:
the means for biasing comprises at least one spring washer mounted over the shaft between the pulley and a mounting piece on an end of the shaft.

11. An apparatus for driving and braking a rotary cutting blade of a lawn mower powered by an engine, the apparatus comprising:
  a shaft secured to the cutting blade for rotating the cutting blade, the shaft extending through a passageway in a housing;
  a pulley driven by the engine, the shaft being rotatably secured in a center of the pulley, the pulley being positioned above the housing;
  means for biasing the pulley away from the housing,
  means for translating the pulley toward the housing;
  wherein the apparatus has a stopped position in which the housing and the means for translating are in contact at a friction surface between the housing and the means for translating,
  wherein the apparatus has a cutting position in which the housing and the means for translating are not in contact at the friction surface,
  wherein, when power is delivered from the engine to drive the pulley, the means for translating transitions the apparatus from the stopped position to the cutting position such that the housing and the means for translating are not in contact at the friction surface and the cutting blade rotates, and
  wherein, when power ceases being delivered from the engine to drive the pulley, the apparatus moves from the cutting position to the stopped position such that the housing and the means for translating are placed in contact at the friction surface and the cutting blade stops.

12. The apparatus of claim 11 wherein:
the means for translating comprises:
  a first transverse member mounted to the pulley; and
  a second transverse member mounted to the shaft, at least one of the first transverse member and the second transverse member having a cam surface inclined upward in a direction of shaft rotation from a first stop to a second stop;
  wherein, when power is delivered from the engine to drive the pulley, the apparatus moves from the stopped position to the cutting position by way of travel of the first transverse member or the second transverse member on the inclined cam surface from the first stop to the second stop such that the housing and the second transverse member are not in contact at the friction surface and the cutting blade rotates, and
  wherein, when power ceases being delivered from the engine to drive the pulley, the apparatus moves from the cutting position to the stopped position by way of travel of the first transverse member or the second transverse member on the inclined cam surface from the second stop to the first stop such that the housing and the second transverse member are placed in contact at the friction surface and the cutting blade stops.

13. The apparatus of claim 12 wherein:
the first transverse member and the second transverse member are annular.

14. The apparatus of claim 12 wherein:
the first transverse member or the second transverse member includes an outwardly projecting rib for travel on the inclined cam surface.

15. The apparatus of claim 14 wherein:
the first transverse member includes a plurality of the outwardly projecting rib equally spaced around the first transverse member, and
the second transverse member includes a plurality of the inclined cam surface equally spaced around the second transverse member.

16. The apparatus of claim 11 wherein:
the means for translating comprises:
  a first transverse member mounted to the pulley, the first transverse member having a first bearing surface inclined upward in a direction of shaft rotation, the first transverse member having a first stop and a second stop;
  a second transverse member mounted to the shaft, the second transverse member having a second bearing surface inclined upward in a direction of shaft rotation, the second transverse member having a third stop and a fourth stop; and
  a bearing positioned in contact with the first bearing surface and the second bearing surface,
  wherein, when power is delivered from the engine to drive the pulley, the apparatus moves from the stopped position to the cutting position by way of travel of the first bearing surface on the bearing from the first stop to the second stop and travel of the second bearing surface on the bearing from the third stop to the fourth stop such that the housing and the means for translating are not in contact at the friction surface and the cutting blade rotates, and
  wherein, when power ceases being delivered from the engine to drive the pulley, the apparatus moves from the cutting position to the stopped position by way of travel of the first bearing surface on the bearing from the second stop to the first stop and travel of the second bearing surface on the bearing from the fourth stop to the third stop such that the housing and the means for translating are placed in contact at the friction surface and the cutting blade stops.

17. The apparatus of claim 16 wherein:
the first transverse member and the second transverse member are annular.

18. The apparatus of claim 11 wherein:
the friction surface is a side of a friction material.

19. The apparatus of claim 11 wherein:
the friction surface is a ring of friction material mounted on the means for translating or the housing.

20. The apparatus of claim 11 wherein:
the means for biasing comprises at least one spring washer mounted over the shaft between a transverse mounting piece on the shaft and the means for translating.

* * * * *